United States Patent
Hu et al.

(10) Patent No.: US 11,870,552 B2
(45) Date of Patent: *Jan. 9, 2024

(54) APPARATUS AND METHOD FOR COHERENT OPTICAL MULTIPLEXING 1+1 PROTECTION

(71) Applicant: II-VI Delaware, Inc., Wilmington, DE (US)

(72) Inventors: Peigang Hu, Fujian (CN); Yajun Wang, Fujian (CN)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,510

(22) Filed: Mar. 21, 2023

(65) Prior Publication Data
US 2023/0224060 A1 Jul. 13, 2023

Related U.S. Application Data

(63) Continuation of application No. 17/664,714, filed on May 24, 2022, now Pat. No. 11,637,646, which is a (Continued)

(30) Foreign Application Priority Data

May 29, 2020 (CN) .......................... 202010477314.6

(51) Int. Cl.
*G02F 1/00* (2006.01)
*H04J 14/02* (2006.01)
(Continued)

(52) U.S. Cl.
CPC ...... *H04J 14/0202* (2013.01); *G02B 27/1006* (2013.01); *H04B 10/291* (2013.01); *H04B 10/614* (2013.01)

(58) Field of Classification Search
CPC .... H04J 14/02; H04J 14/0201; H04J 14/0202; H04J 14/021; H04J 14/0212;
(Continued)

(56) References Cited

U.S. PATENT DOCUMENTS 7,231,148 B2 * 6/2007 Kinoshita ........... H04J 14/0241
398/4
7,499,652 B2 * 3/2009 Zhong ................ H04J 14/0212
398/83

(Continued)

*Primary Examiner* — Hanh Phan
(74) *Attorney, Agent, or Firm* — Blank Rome LLP

(57) ABSTRACT

Coherent optical multiplexing 1+1 protection disclosed herein uses multiplexers, each having multiplexing and demultiplexing sub-units. Relay ports of a node are connected with the multiplexers, and each relay port is configured to input and output optical signals with the corresponding multiplexer. Two transmission ports of the node are connected with disjoint paths and are configured to input and output optical signals therewith. The node includes: a first optical splitter having input ports connected with the relay ports and two output ports connected with the two transmission ports; an optical switch connected with the transmission ports respectively via two input interfaces; a second optical splitter, which is a 1×N optical splitter, having one input port connected with an output interface of the optical switch and having output ports connected with the relay ports. The solution is reliable in implementation, has low insertion loss, and has good transmission performance.

20 Claims, 3 Drawing Sheets

Related U.S. Application Data continuation of application No. 17/335,231, filed on Jun. 1, 2021, now Pat. No. 11,374,673.

(51) Int. Cl.
 *G02B 27/10* (2006.01)
 *H04B 10/291* (2013.01)
 *H04B 10/61* (2013.01)

(58) Field of Classification Search
 CPC .. H04J 14/0289; H04J 14/029; H04J 14/0294; H04B 10/032; H04B 10/035; H04B 10/038; H04Q 11/0003; H04Q 11/0005; H04Q 11/0066; H04Q 11/0067
 USPC ........ 398/79, 83, 45, 48, 49, 2, 3, 4, 5, 7, 8, 398/10, 13, 17, 82, 59, 68, 72, 158, 159, 398/33, 38, 24, 37, 16, 18
 See application file for complete search history.

(56) References Cited

U.S. PATENT DOCUMENTS

| | | |
|---|---|---|
| 9,723,385 B2 | 8/2017 | Hu et al. |
| 2007/0031146 A1* | 2/2007 | Takachio ........... H04B 10/2755 398/4 |

* cited by examiner

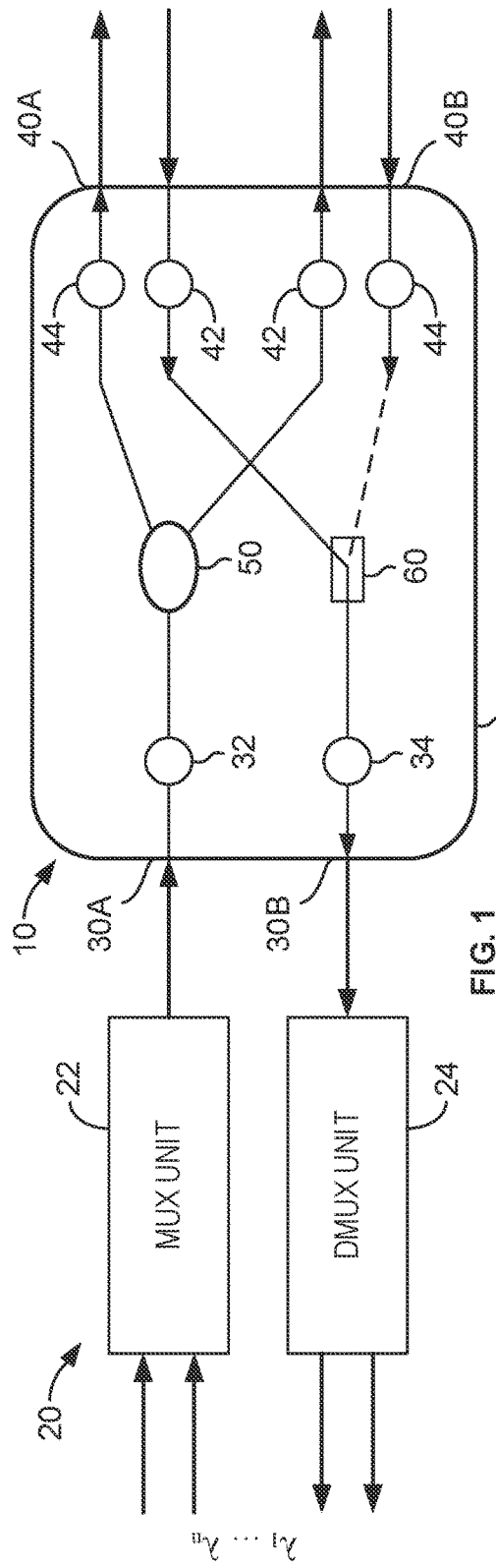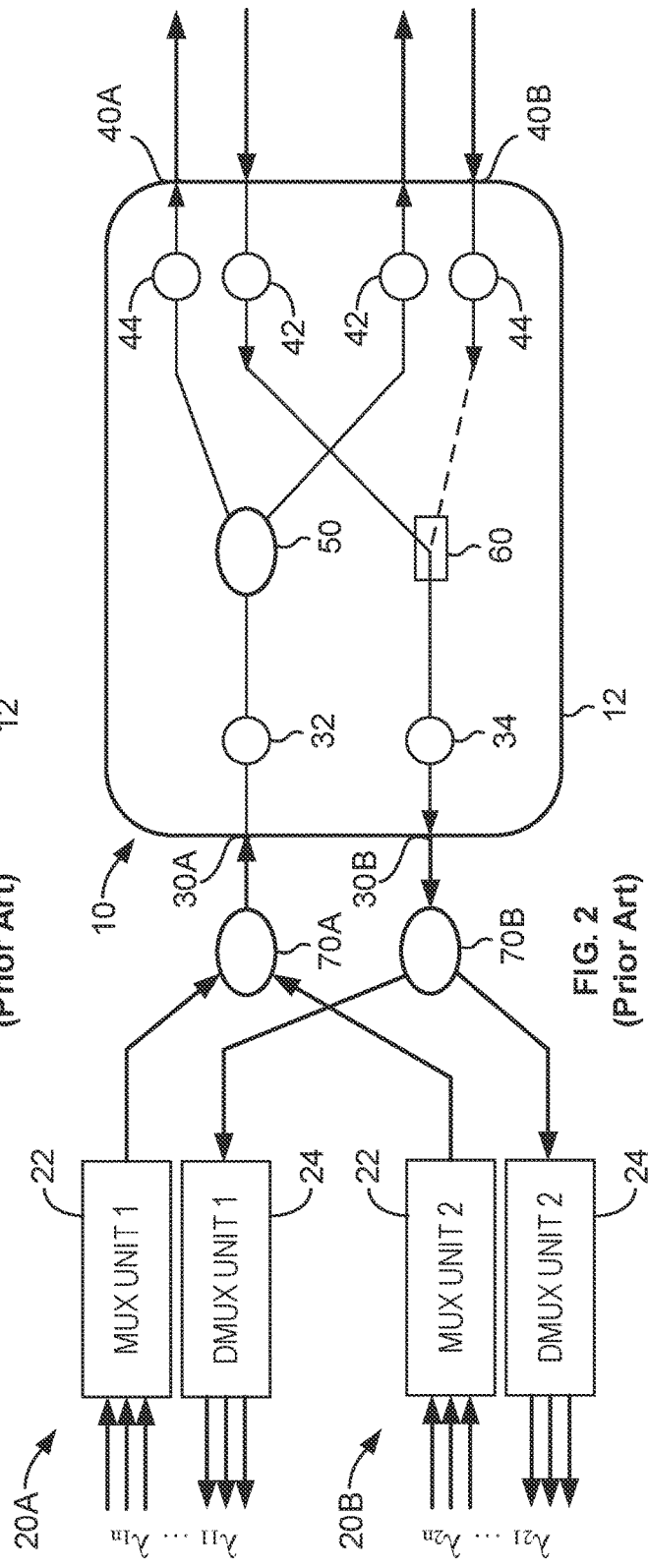
FIG. 1 (Prior Art)
FIG. 2 (Prior Art)

APPARATUS AND METHOD FOR COHERENT OPTICAL MULTIPLEXING 1+1 PROTECTION

CROSS-REFERENCE TO RELATED APPLICATIONS

This application is a continuation of U.S. patent application Ser. No. 17/664,714, filed May 24, 2022, which is a continuation of U.S. patent application Ser. No. 17/335,231, filed Jun. 1, 2021 now U.S. Pat. No. 11,374,673, issued Jun. 28, 2022, which claims the benefit under 35 U.S.C. 119 to Chinese Appl. No. 202010477314.6 filed 29 May 2020.

FIELD OF THE DISCLOSURE

The present disclosure relates to the technical field of an optical apparatus, and in particular, to an apparatus and a method for coherent optical multiplexing 1+1 protection.

BACKGROUND OF THE DISCLOSURE

In a high-capacity optical network having wavelength-division-multiplexed (WDM) channels, an element of the network can fail. For example, a fiber link may be cut, a node may fault, or other failure may occur. In turn, this network failure will cause several optical channels to fail and data to be lost. To protect data on the network, two copies of the data can be routed over disjoint paths using a technique called dedicated path protection (also called 1+1 protection). A link-disjoint backup path and wavelength are reserved for each primary path, and the backup wavelength is not shared with other backup paths. Should failure occur, the network protected in this way can be rapidly recovered from a failure.

A conventional solution to provide optical multiplexing signal 1+1 protection typically has one signal port and two ports that offer the mutual 1+1 protection. Examples according to the prior art are shown in FIG. 1 and FIG. 2.

Briefly, the prior art apparatus 10 of FIG. 1 includes a multiplexing/demultiplexing unit 20 and includes a node 12 having two relay ports 30A-B, a plurality of transmission ports 40A-B, an optical splitter 50, and an optical switch 60. This apparatus 10 is configured for 1+1 line protection, in which both the splitting between working and protection lines and the selection between the lines is done for the entire WDM signal together.

The multiplexing/demultiplexing unit 20 includes one multiplexing sub-unit 22 and one demultiplexing sub-unit 24. One of the relay ports 30A includes a multiplexing transmission unit 32, and the other relay port 30B has a demultiplexing transmission unit 34. The multiplexing transmission unit 32 is configured to receive a signal transmitted by the multiplexing sub-unit 22, and the demultiplexing transmission unit 34 is configured to transmit a signal to the demultiplexing sub-unit 24. Two transmission ports 40A-B are provided, and each of the transmission ports 40A-B includes one input unit 42 and one output unit 44.

The optical splitter 50 is a 1×2 optical splitter and includes one input port and two output ports. The input port of the optical splitter 50 is connected with the multiplexing transmission unit 32 of one relay unit 30A, and the two output ports of the optical splitter 50 are connected respectively with the output units 44 of the two transmission ports 40A-B.

The optical switch 60 is a 2×1 optical switch and includes two input interfaces and one output interface. The optical switch 60 is connected with the input units 42 of the two transmission ports 40A-B respectively via the two input interfaces. The output port of the optical splitter 60 is connected with the demultiplexing transmission unit 34 of the second relay port 30B.

The sub-units 22, 24 can be wavelength selective switches. The ports for individual wavelengths on these WWS sub-units 22, 24 as in FIG. 1 can be limited to 32. It may be advantageous to use more ports for individual wavelength multiplexing, such up to 80 ports for extended C-band. To support these larger port counts, a combiner can be used to combine the outputs of multiple WSS units, with the input of each WSS sub-unit representing a wavelength.

For example, the prior art apparatus of FIG. 2 includes multiplexing/demultiplexing units 20AB, an external combiner 70A, an external splitter 70B, and a node 12 having two relay ports 30A-B, a plurality of transmission ports 40A-B, an optical splitter 50, and an optical switch 60. Components of the package are the same as in FIG. 1.

The units 20A-B each include a multiplexing sub-unit 22 and a demultiplexing sub-unit 24, which can be wavelength selective switches. The external combiner 70A and splitter 70B allow for the multiple multiplexing/demultiplexing units 20A-B to be used so that more ports for individual wavelength multiplexing are available.

The conventional solutions for providing 1+1 protection has a problem that it is impossible to steadily ensure the signal transmission quality in the presence of relatively high insertion loss and multi-channel signal transmission.

SUMMARY OF THE DISCLOSURE

A node is disclosed herein for coherent optical multiplexing 1+1 protection for optical signals of multiplexers on disjoint paths. The apparatus comprises a plurality of relay ports, first and second transmission ports, a first optical splitter, an optical switch, and a second optical splitter. Each of the plurality of relay ports is connected to one of the multiplexers. Each of the relay ports is configured to input the optical signals from the connected multiplexer and is configured to output the optical signals to the connected multiplexer. Each of the first and second transmission ports is configured to input and output the optical signals of one of the disjoint paths. The first optical splitter has first inputs and first outputs. Each of the first inputs is connected with one of the relay ports, and each the first outputs is connected with one of the transmission ports. The optical switch has two input interfaces and one output interface. Each of the two input interfaces is connected with one of the transmission ports. The second optical splitter has a second input and second outputs. The second input is connected with the output interface of the optical switch, and each of the second outputs is connected with one of the relay ports.

An apparatus is disclosed for coherent optical multiplexing 1+1 protection of optical signals on disjoint paths. The apparatus comprises a plurality of multiplexers, a plurality of relay ports, first and second transmission ports, a first optical splitter, an optical switch, and a second optical splitter. Each of the multiplexers is configured to multiplex and demultiplex the optical signals. Each of the relay ports is connected to one of the multiplexers. Each of the relay ports is configured to input the optical signals from the connected multiplexer and is configured to output the optical signals to the connected multiplexer. Each of the first and second transmission ports is configured to input and output the optical signals of one of the disjoint paths. The first optical splitter has first inputs and first outputs. Each of the first inputs is connected with one of the relay ports, and each the first outputs is connected with one of the transmission ports. The optical switch has two input interfaces and one output interface. Each of the two input interfaces is connected with one of the transmission ports. The second optical splitter has a second input and second outputs. The second input is connected with the output interface of the optical switch, and each of the second outputs is connected with one of the relay ports.

A method is disclosed for coherent optical multiplexing 1+1 protection of optical signals on disjoint paths. The method comprises operating in an add direction by: inputting, at each of a plurality of relay ports, first of the optical signals from a corresponding one of a plurality of multiplexers; splitting, at a first optical splitter, the first input optical signals from the plurality of relay ports to a plurality of transmission ports; and outputting the first split optical signals from each of the transmission ports on one of the disjoint paths. The method comprises operating in a drop direction by: inputting, at each of the transmission port, second of the optical signals from one of the disjoint paths; selecting, at an optical switch, the second optical signals input from one of the transmission ports; splitting, at a second optical splitter, the second selected optical signals from the optical switch to each of the relay ports; and outputting the second split optical signals from each of the relay ports to the corresponding one of the multiplexers.

The foregoing summary is not intended to summarize each potential embodiment or every aspect of the present disclosure.

BRIEF DESCRIPTION OF THE DRAWINGS

The solution of the present disclosure will be further described below with reference to the accompany drawings and specific embodiments.

FIG. 1 is a schematic diagram of a conventional apparatus of the prior art for optical multiplexing signal 1+1 protection.

FIG. 2 is a schematic diagram of another conventional apparatus of the prior art for optical multiplexing signal 1+1 protection.

DETAILED DESCRIPTION

Figure 3:
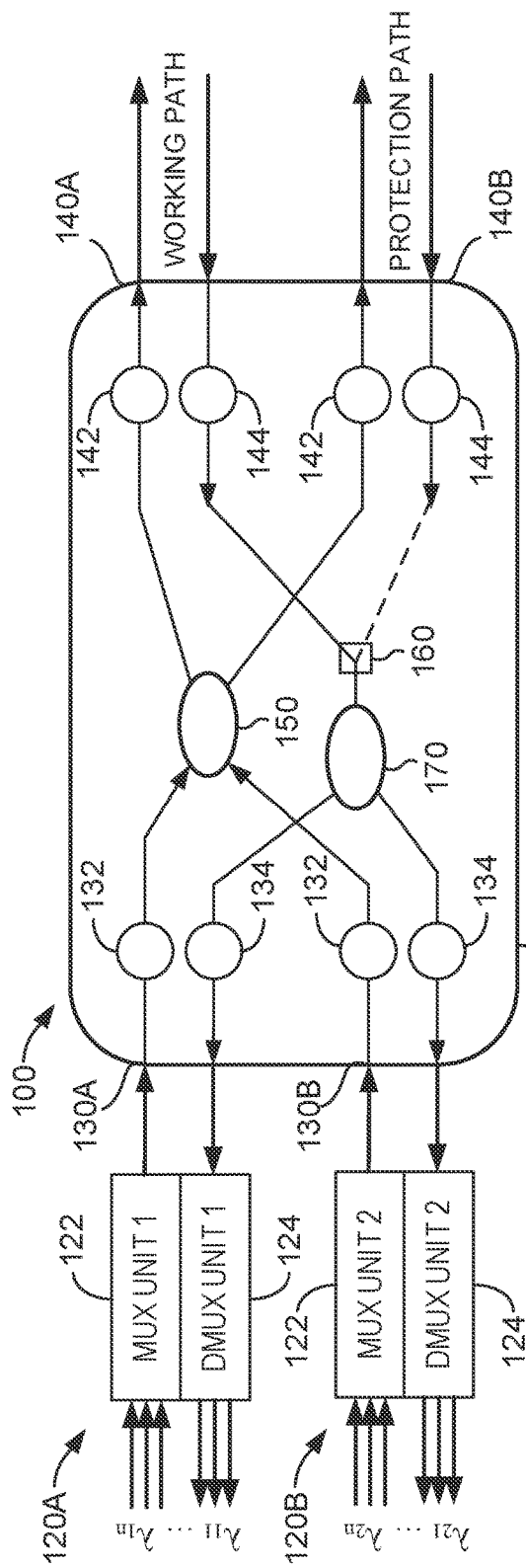
FIG. 3 is a schematic diagram of a coherent optical multiplexing 1+1 protection apparatus according to a first embodiment of the present disclosure.

FIG. 3 schematically illustrates an apparatus 100 for providing coherent optical multiplexing 1+1 protection according to the present disclosure. As will be appreciated, the apparatus 100 is part of an optical network (not shown) and is used for dedicated path protection (also called 1+1 protection) to protect data should there be a failure in the network.

The apparatus 100 includes a plurality of multiplexers 120A-B and a node 102. The multiplexers 120A-B are multiplexing/demultiplexing units. In this arrangement, the apparatus 100 includes two multiplexing/demultiplexing units 120A-B, each of which includes one multiplexing sub-unit 122 and one demultiplexing sub-unit 124. Each unit 120A-B can connect with other components (not shown) of a network, such as used in an optical communication system. The node 102 has a plurality of relay ports 130A-B, a plurality of transmission ports 140A-B, a first optical splitter 150, an optical switch 160, and a second optical splitter 170.

In general, the multiplexing/demultiplexing units 120A-B can be Arrayed Waveguide Granting (AWG) modules, Athermal Array Waiveguide (AAWG) modules, Wavelength Selective Switch (WSS) modules, and cascaded Thin Film Filter (TFF) modules. As further shown, each of the units 120A-B supports a unique set of wavelengths. Thus, the inputs/outputs for the first unit 120A support a first set of unique wavelengths $\square_{11} \ldots \square_{1n}$, and the inputs/outputs for the second unit 120B support a second set of unique wavelengths $\square_{21} \ldots \square_{2n}$. Although each unit 120A-B can support a unique set of wavelengths, other configurations can be used that allow for combining wavelengths within a band and for combining wavelengths between bands (e.g. C+L band).

The two relay ports 130A-B correspond to (and are connected with), in a one-to-one manner, the multiplexing/demultiplexing units 120A-B. Each of the relay ports 130A-B includes one multiplexing transmission unit 132 and one demultiplexing transmission unit 134. In general, each of the relay ports 130A-B can use any suitable components. The multiplexing transmission unit 132 is configured to receive optical signals transmitted by a corresponding multiplexing sub-unit 122, and the demultiplexing transmission unit 134 is configured to transmit optical signals to a corresponding demultiplexing sub-unit 124. These transmission units 132, 134 can use any suitable components.

Two transmission ports 140A-B are provided for the node 102, and each of the transmission ports 140A-B includes one output unit 142 and one input unit 144. These output and input units 142, 144 can use any suitable components.

The first optical splitter 150 in the present arrangement is a 2×2 optical splitter and includes two input ports and two output ports. In general, a suitable optical switch 150 can use any suitable components. The input ports of the first optical splitter 150 are respectively connected with the multiplexing transmission units 132 of the two relay units 130A-B, and the two output ports of the first optical splitter 150 are connected respectively with the output units 142 of the two transmission ports 140A-B.

The optical switch 160 in the present arrangement is a 2×1 optical switch and includes two input interfaces and one output interface. In general, a suitable optical switch 160 can use any suitable components. The optical switch 160 is connected with the input units 144 of the two transmission ports 140A-B respectively via the two input interfaces. The optical switch 160 can be a fixed optical switch or a remotely reconfigurable optical switch.

The second optical splitter 170 the present arrangement is a 1×2 optical splitter and has one input port and two output ports. In general, a suitable optical splitter 170 can use any suitable components. The input port of the second optical splitter 170 is connected with the output interface of the optical switch 160, and the two output ports of the second optical splitter 170 are respectively connected with the demultiplexing transmission units 134 of the relay ports 130A-B.

As further shown, a packaging shell 104 for the node 102 can package the two relay ports 130A-B, the two transmission ports 140A-B, the first optical splitter 150, the optical switch 160, and the second optical splitter 170 into an integral structure.

Having an understanding of the apparatus 100, discussion now turns to the operation of the apparatus 100 for coherent optical multiplexing 1+1 protection. Each unit 120A-B of the multiple optical add/drop units of the present solution can support multi-wavelength multiplexing/demultiplexing (through filtering or coupling). In the add direction, the node 102 is a source node and is used to bridge the optical signals to traverse two optical paths (i.e., the disjoint paths of a working path and a protection path). In the add direction, the wavelength-division multiplexing signals from the units 120A-B are optically coupled at the relay ports 130A-B and are then split by the first optical splitter 150 to the transmission ports 140A-B to realize the 1+1 transmitting function along the working and protection paths. In particular, an optical signal in the add direction from the multiplexing sub-units 122 of the multiplexing/demultiplexing units 120A-B enters the multiplexing transmission units 132 of the relay ports 130A-B, is subsequently coupled, and enters the first optical splitter 150. At the splitter 150, the optical signal is then split into two optical signals that respectively enter the output units 142 of the two transmission ports 140A-B to be output.

In the drop direction, the node 102 is a destination node and is used to select one of the optical paths (working path or protection path) based on switching criteria. Here, a wavelength-division multiplexing signal on one of the working and protecting paths at the units 144 is selected by the optical switch 160 and is then broadcast by the second optical splitter 170 to the plurality of optical add/drop units 120A-B to realize the selective receiving function of 1+1 optical protection. In particular, via the input units 144 of the two transmission ports 140A-B, an optical signal is input to the optical switch 170 and is then input, as selected by the optical switch 170, into the second optical splitter 170. The second optical splitter 170 splits the input optical signal into two signals and respectively inputs the signals into the demultiplexing transmission units 144 of the relay ports 140A-B. These signals are then correspondingly output to the demultiplexing sub-units 124 of the two multiplexing/demultiplexing units 120A-B.

Figure 4:
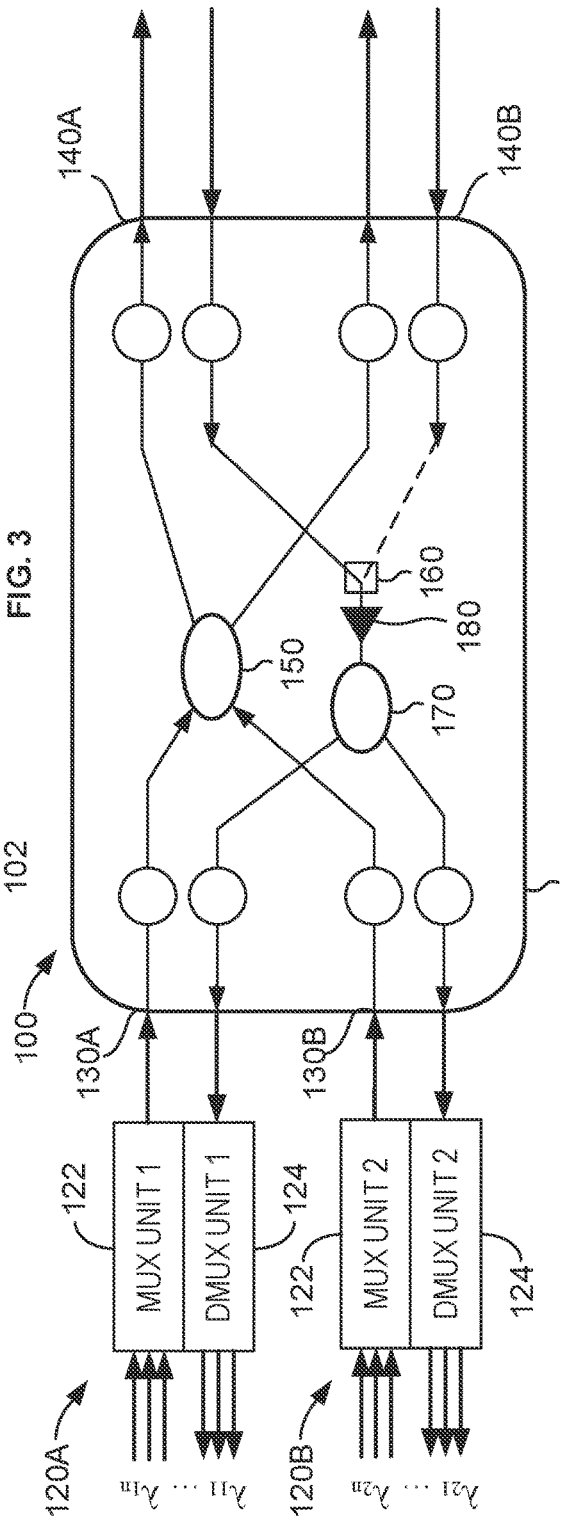
FIG. 4 is a schematic diagram of a coherent optical multiplexing 1+1 protection apparatus according to a second embodiment of the present disclosure.

FIG. 4 schematically shows another embodiment of an apparatus 100 according to the present disclosure. This apparatus 100 is similar to that discussed above in FIG. 3 so that the same reference numerals are used for similar components. This apparatus 100 differs in that an optical amplifier 180 is provided between the optical switch 160 and the second optical splitter 170.

Again, the apparatus 100 includes a plurality of multiplexers 120A-B and a node 102. The multiplexers 120A-B are multiplexing/demultiplexing units 120A-B. The node 102 has a plurality of relay ports 130A-B, a plurality of transmission ports 140A-B, a first optical splitter 150, an optical switch 160, and a second optical splitter 170. In this arrangement, the two multiplexing/demultiplexing units 120A-B, the two relay ports 130A-B, the two transmission ports 140A-B, the first optical splitter 150, the optical switch 160, and the second optical splitter 170 in the present embodiment are all the same as those in FIG. 3. During operation, the optical amplifier 180 can amplify an optical signal from the optical switch 160 to the splitter 170 should attenuation occur.

Figure 5:
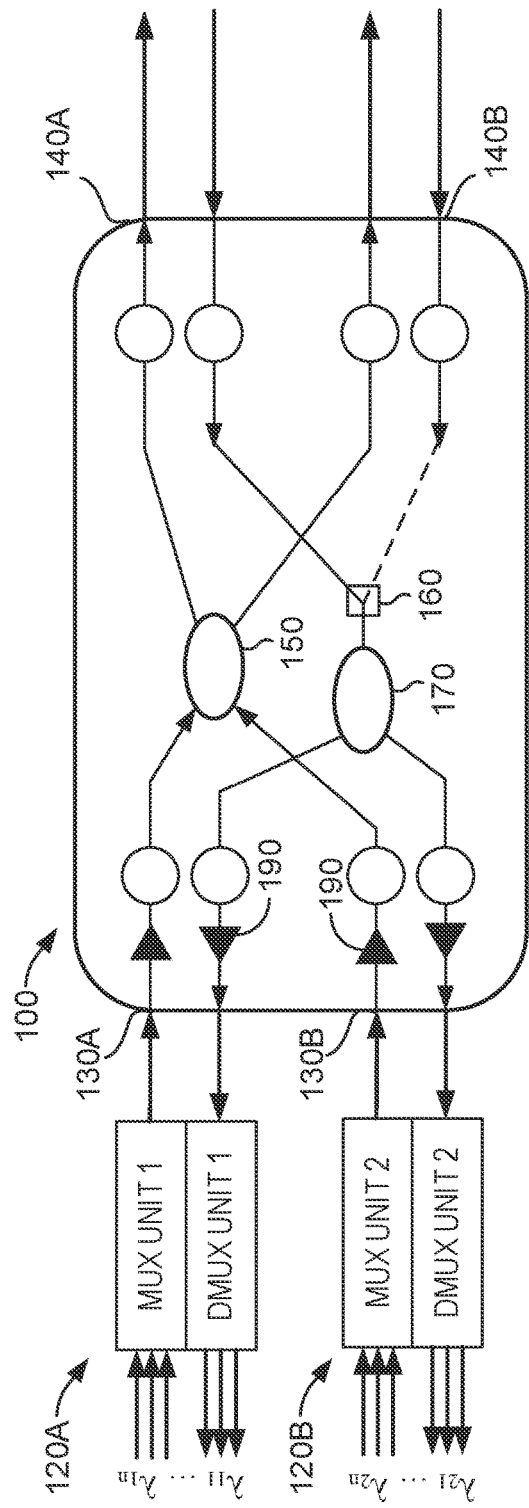
FIG. 5 is a schematic diagram of a coherent optical multiplexing 1+1 protection apparatus according to a third embodiment of the present disclosure.

FIG. 5 schematically shows another embodiment of an apparatus 100 according to the present disclosure. This apparatus 100 is similar to that discussed above in FIGS. 3-4 so that the same reference numerals are used for similar component. Again, the apparatus 100 includes a plurality of multiplexers 120A-B and a node 102. The multiplexers 120A-B are multiplexing/demultiplexing units 120A-B. The node 102 has a plurality of relay ports 130A-B, a plurality of transmission ports 140A-B, a first optical splitter 150, an optical switch 160, and a second optical splitter 170. In this arrangement, this apparatus 100 differs in that optical amplifiers 190A-B are provided between the two output ports of the second optical splitter 170 and the demultiplexing transmission units 132 of the relay ports 130A-B.

As before, the two multiplexing/demultiplexing units 120A-B, the two relay ports 130A-B, the two transmission ports 140A-B, the first optical splitter 150, the optical switch 160, and the second optical splitter 170 in the present embodiment are all the same as those disclosed above. During operation, the amplifiers 190A-B can amplify optical signals should attenuation occur.

Figure 6:
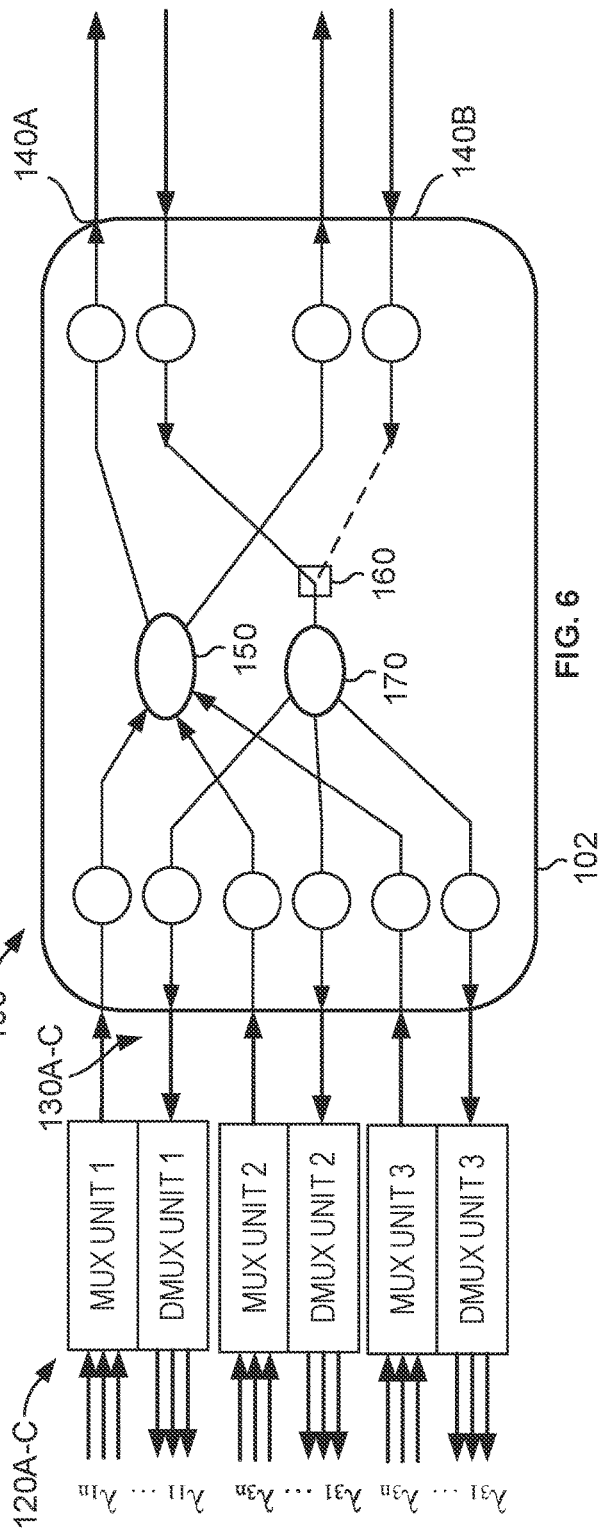
FIG. 6 is a schematic diagram of a coherent optical multiplexing 1+1 protection apparatus according to a fourth embodiment of the present disclosure.

Previous arrangements included two multiplexers and associated relay ports. An apparatus of the present disclosure can use more than two of the relevant elements. As shown in FIG. 6, for example, another apparatus 100 of the present disclosure is substantially the same as previous embodiments, namely that of FIG. 3, but differs in that the relevant elements in the present embodiment number greater than two.

Again, the apparatus 100 includes a plurality of multiplexers 120A-C and a node 102. The multiplexers 120A-C are multiplexing/demultiplexing units 120A-C. The node 102 has a plurality of relay ports 130A-C, a plurality of transmission ports 140A-B, a first optical splitter 150, an optical switch 160, and a second optical splitter 170. In this arrangement, three multiplexing/demultiplexing units 120A-C and three relay ports 130A-C are provided. The first optical splitter 150 is a 3×2 optical splitter, and the second optical splitter 170 is a 1×3 optical splitter. In general, the units 120A-C, the relay ports 130A-C, the two transmission ports 140A-B, the first optical splitter 150, the optical switch 160, and the second optical splitter 170 in the present embodiment perform in a comparable manner as in previous embodiments.

As will be appreciated based on the present disclosure, any of the embodiments in FIGS. 4 and 5 can also include a number of relevant elements greater than two. Although these arrangements are not expressly shown, one skilled in the art would appreciate their implementations based on the teachings of the present disclosure.

In summary, the teachings of the present disclosure are directed to an apparatus 100 for providing coherent optical multiplexing 1+1 protection having good optical performance and low loss. As disclosed herein, the apparatus 100 for coherent optical multiplexing 1+1 protection comprises a plurality (N) of multiplexing/demultiplexing units 120, a plurality (N) of relay ports 130, two transmission ports 140, a first optical splitter 150, an optical switch 160, and a second optical splitter 170. Each of multiplexing/demultiplexing units 120 includes one multiplexing sub-unit 122 and one demultiplexing sub-unit 124. In the apparatus 100, the multiplexing/demultiplexing units 120 can be Arrayed Waveguide Granting (AWG) modules, Athermal Array Waiveguide (AAWG) modules, Wavelength Selective Switch (WSS) modules, and cascaded Thin Film Filter (TFF) modules having filtering functions or 1:N optical coupling modules without filtering functions.

The N relay ports 130 correspond to and are connected with, in a one-to-one manner, the N multiplexing/demultiplexing units 120. Each of the relay ports 130 includes one multiplexing transmission unit 132 and one demultiplexing transmission unit 134. The multiplexing transmission unit 132 is configured to receive a signal transmitted by a corresponding multiplexing sub-unit 122, and the demultiplexing transmission unit 134 is configured to transmit a signal to a corresponding demultiplexing sub-unit 124. Each of the transmission ports 140 comprises one output unit 142 and one input unit 144.

The first optical splitter 150, which is an N×2 optical splitter, comprises a plurality (N) of input ports and two output ports. The N input ports of the first optical splitter 150 are connected with the multiplexing transmission units 132 of the N relay units 130, and the two output ports of the first optical splitter 150 are connected respectively with the output units 132 of the two transmission ports 130.

The optical switch 160, which is a 2×1 optical switch, comprises two input interfaces and one output interface. The optical switch 160 is connected with the input units 134 of the two transmission ports 130 respectively via the two input interfaces.

The second optical splitter 170, which is a 1×N optical splitter, has one input port and N output ports. The input port of the second optical splitter 170 is connected with the output interface of the optical switch 160, and the N output ports of the second optical splitter 170 are respectively connected with the demultiplexing transmission units 134 of the N relay ports 130. The apparatus 100 can further include a packaging shell 104 configured to package the N relay ports 130, the two transmission ports 140, the first optical splitter 150, the optical switch 160, and the second optical splitter 170 into an integral structure.

Moreover, the apparatus 100 can include one or more optical amplifiers to amplify the optical signals. As in FIG. 4, an optical amplifier 150 can be provided between the optical switch 160 and the second optical splitter 170, or optical amplifiers 190 as in FIG. 5 can be provided between the N output ports of the second optical splitter 170 and the demultiplexing transmission units 132 of the N relay ports 130. In add/drop applications of coherent wavelengths, the multiplexing and demultiplexing units 120A-B do not need to filter and drop every single wavelength for drop, and thus can improve the frequency spectrum utilization in an optical coupling manner. In a drop optical path where the plurality of units 120A-B use the same filter, an optical unit of the present disclosure optionally uses an optical amplifier 180, 190A-B to compensate for losses of protecting and broadcasting units, thereby increasing the optical power of drop wavelength so as to improve the performance.

As disclosed herein, a method for coherent optical multiplexing 1+1 protection comprises at least one of the following steps: (1) an optical signal enters, via the multiplexing sub-units 122 of the N multiplexing/demultiplexing units 120A-B, the multiplexing transmission units 132 of the N relay ports 130A-B, subsequently is coupled and enters the first optical splitter 150, and is then split by the first optical splitter 150 into two optical signals that respectively enter the output units 142 of the two transmission ports 140A-B to be output; and (2) an optical signal is input via the input units 144 of the two transmission ports 140A-B, and is input, as selected by the optical switch 160, into the second optical splitter 170, wherein the second optical splitter 170 splits the input optical signal into N signals and respectively inputs the N signals into the demultiplexing transmission units 134 of the N relay ports 130A-B, and the signals are then correspondingly output to the demultiplexing sub-units 124 of the N multiplexing/demultiplexing units 120A-B. The apparatus 100 can be used to support protection from line (add) side with an N×2 coupler used for the add side. A cascade switch+N×1 coupler are used for the client (drop) side. Client side protection can be provided at the same time if additional couplers are added. Amplifiers can be used to improve the performance.

The present solution integrates and combines a plurality of functional units, reduces optical loss, and maintains good optical performance while increasing the number of add/drop ports available. In one particular benefit, the apparatus 100 reducers insertion losses on the add side, which can definitely improve the OSNR performance. The apparatus 100 is suitable for add/drop applications for high-speed, high-order modulation of coherent light with high performance requirements. Additionally, the apparatus 100 is also suitable for multiplex section line protection applications with multiple add/drop units using coherent optical interfaces having a relatively low transmission power, such as a 400G ZR interface. As is known, 400G ZR is a standard that uses dense wavelength division multiplexing (DWDM) and higher order modulation to transmit 400 gigabit Ethernet over interconnection links (up to 100 km).

Compared with the prior art, the present multiplexing multi-wavelength signal 1+1 protection solution is applicable to multi-port add/drop functions of coherent optical wavelengths and has small insertion loss, full spectral width, and multiple channel extension. When combined with WSS units or other multiplexing and demultiplexing units, the present solution supports a flexible grid having a high port number and add/drop functions with line protection. A typical add direction of the present solution adopts an N×2 optical splitter, multiple add/drop ports, and two 1+1 protection ports, while a typical 2×2 solution may reduce insertion loss by more than 3 dB relative to a conventional structure. The present solution is applicable to an add/drop solution of coherent light with multiplex section optical protection. The add/drop solution includes a plurality of multiplexing and demultiplexing units to provide the add/drop port number, combines an add coupling unit and an optical 1+1 protection optical splitting unit into an N×2 coupling and splitting unit to reduce add losses, and has integrated protection selection and optical splitting to reduce drop losses, thereby improving the system performance.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A node for coherent optical multiplexing 1+1 protection for optical signals of a plurality of multiplexers on a plurality of disjointed paths, the node comprising:
    a first optical splitter having a plurality of input ports, each connected with one of the plurality of multiplexers, and a plurality of output ports, each connected with one of the plurality of disjointed paths via one of a plurality of transmission ports;
    an optical switch having a single output interface and a plurality of input interfaces, each connected with others of the plurality of transmission ports; and
    a second optical splitter having a single input port connected with the single output interface of the optical switch and a plurality of output ports, each connected with one of the plurality of multiplexers.

2. The node of claim 1, wherein each of the plurality of input ports of the first optical splitter are connected with one of the plurality of multiplexers via one of a plurality of relay ports.

3. The node of claim 2, wherein each of the plurality of output ports of the second optical splitter are connected with one of the plurality of multiplexers via others of the plurality of relay ports.

4. The node of claim 3, further comprising packaging having the plurality of relay ports, the plurality of transmission ports, the first optical splitter, the optical switch, and the second optical splitter.

5. The node of claim 1, further comprising an optical amplifier disposed between the optical switch and the second optical splitter.

6. The node of claim 1, further comprising an optical amplifier disposed between each of the plurality of output ports of the second optical splitter and one of the plurality of multiplexers connected thereto.

7. The node of claim 1, further comprising an optical amplifier disposed between the plurality of input ports of the first optical splitter and one of the plurality of multiplexers connected thereto.

8. An apparatus for coherent optical multiplexing 1+1 protection of optical signals on a plurality of disjointed paths, the apparatus comprising:
a plurality of multiplexers, each configured to multiplex and demultiplex one or more optical signals;
a first optical splitter having a plurality of input ports, each connected with one of the plurality of multiplexers, and a plurality of output ports, each connected with one of the plurality of disjointed paths via one of a plurality of transmission ports;
an optical switch having a single output interface and a plurality of input interfaces, each connected with others of the plurality of transmission ports; and
a second optical splitter having a single input port connected with the single output interface of the optical switch and a plurality of output ports, each connected with one of the plurality of multiplexers.

9. The apparatus of claim 8, wherein each of the plurality of input ports of the first optical splitter are connected with one of the plurality of multiplexers via one of a plurality of relay ports.

10. The apparatus of claim 9, wherein each of the plurality of output ports of the second optical splitter are connected with one of the plurality of multiplexers via others of the plurality of relay ports.

11. The apparatus of claim 10, further comprising packaging having the plurality of relay ports, the plurality of transmission ports, the first optical splitter, the optical switch, and the second optical splitter.

12. The apparatus of claim 9, wherein each of the plurality of relay ports comprises:
a multiplexing transmission unit configured to input the one or more optical signals from a corresponding multiplexing sub-unit of the one of the plurality of multiplexers connected thereto; and
a demultiplexing transmission unit configured to output the one or more optical signals to a corresponding demultiplexing sub-unit of the one of the plurality of multiplexers connected thereto.

13. The apparatus of claim 8, further comprising an optical amplifier disposed between the optical switch and the second optical splitter.

14. The apparatus of claim 8, further comprising an optical amplifier disposed between each of the plurality of output ports of the second optical splitter and one of the plurality of multiplexers connected thereto.

15. The apparatus of claim 8, further comprising an optical amplifier disposed between the plurality of input ports of the first optical splitter and one of the plurality of multiplexers connected thereto.

16. The apparatus of claim 8, wherein the plurality of multiplexers each comprise one of an Arrayed Waveguide Granting (AWG) module, Athermal Array Waiveguide (AAWG) module, Wavelength Selective Switch (WSS) module, a cascaded Thin Film Filter (TFF) module having filtering functions, and a 1:N optical coupling module without filtering functions.

17. The apparatus of claim 8, wherein each of the plurality of multiplexers is configured to support a set of individual wavelengths different from others of the plurality of multiplexers.

18. The apparatus of claim 8, wherein each of the plurality of multiplexers is configured to support a set of individual wavelengths with at least some of the individual wavelengths combined within a band or combined between bands.

19. A system for coherent optical multiplexing 1+1 protection of optical signals on a plurality of disjointed paths, the system comprising:
a first optical splitter having a plurality of input ports, each connected with one of a plurality of multiplexers, and a plurality of output ports, each connected with one of the plurality of disjointed paths via one of a plurality of transmission ports;
an optical switch having a single output interface and a plurality of input interfaces, each connected with others of the plurality of transmission ports;
a second optical splitter having a single input port connected with the single output interface of the optical switch and a plurality of output ports, each connected with one of the plurality of multiplexers; and
a packaging having the plurality of transmission ports, the first optical splitter, the optical switch, and the second optical splitter.

20. The system of claim 19, further comprising an optical amplifier disposed between one of:
the optical switch and the second optical splitter;
each of the plurality of output ports of the second optical splitter and one of the plurality of multiplexers connected thereto; and
the plurality of input ports of the first optical splitter and one of the plurality of multiplexers connected thereto.

\* \* \* \* \*